(12) United States Patent  (10) Patent No.: US 8,938,710 B2
Wu  (45) Date of Patent: Jan. 20, 2015

(54) PREVENTING INTERFERENCE BETWEEN SUBSYSTEM BLOCKS AT A DESIGN TIME

(71) Applicant: The MathWorks, Inc., Natick, MA (US)

(72) Inventor: Pengcheng Wu, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/729,982

(22) Filed: Dec. 28, 2012

(65) Prior Publication Data

US 2014/0189637 A1 Jul. 3, 2014

(51) Int. Cl.
*G06F 9/44* (2006.01)

(52) U.S. Cl.
CPC ... *G06F 8/35* (2013.01); *G06F 8/34* (2013.01)
USPC ........................................................ 717/105

(58) Field of Classification Search
CPC .............. G06F 8/34; G06F 8/35; G05B 19/00
USPC .................................................. 717/103–113
See application file for complete search history.

(56) References Cited

PUBLICATIONS

Lilia Sfaxi et al., "Information Flow Control of Component-based Distributed Systems", 2010, John Wiley & Sons, Ltd., pp. 1-19.*

Mark Charlwood et al., "A methodology for the assignment of safety integrity levels (SILs) to safety-related control functions implemented by safety-related electrical, electronic and programmable electronic control systems of machines", 2004, HSE Books, pp. i-viii, 1-69.*

* cited by examiner

*Primary Examiner* — Ted T Vo
(74) *Attorney, Agent, or Firm* — Wilmer Cutler Pickering Hale and Dorr LLP (57) ABSTRACT

A method of preventing interference between subsystem blocks includes obtaining an integrity level for a first subsystem block, obtaining an integrity level for a second subsystem block, assigning an integrity level property to at least one input port of the first block, the integrity level property assigned to the input port of the first block being based on the integrity level defined for the first block, and assigning an integrity level property to at least one output port of the second block, the integrity level property assigned to the output port of the second block being based on the integrity level defined for the second block. The method further includes evaluating the integrity level property of at least one input/output pair to determine whether an inappropriate connection exists, and performing a first action when an inappropriate connection exists, or performing a second action when an appropriate connection exists.

36 Claims, 7 Drawing Sheets

PREVENTING INTERFERENCE BETWEEN SUBSYSTEM BLOCKS AT A DESIGN TIME

DETAILED DESCRIPTION

Graphical modeling tools (e.g., MathWorks Simulink environment, among others—can be referred to generally as modeling tools) may be used to model and simulate the behavior of a system or collection of systems. Such modeling tools may represent a system or a collection of systems as an interconnected set of subsystem blocks. A subsystem block may be a collection of components constructed and arranged to perform a complex function, or a subsystem block may be a single basic block (e.g., an amplifier or resistor). Each subsystem block may include certain interfaces, such as inports (input ports) and outports (output ports), through which the subsystem blocks are interconnected. The subsystem blocks may be arranged in a hierarchical structure (e.g., such that one of the collection of components represents a subsystem block itself), a non-hierarchical structure, or a combination of hierarchical and non-hierarchical structures.

The interconnections between subsystem blocks in a model facilitate communication between the subsystem blocks, i.e., they enable a subsystem block to influence one or more other subsystem blocks. The influence of one block to other blocks may be part of the system design and therefore intentional. As the system model becomes more complex, the likelihood of unintentional influence of one subsystem block on another subsystem block increases. Such unintended influence can be referred to as subsystem interference.

The following example illustrates why it is important to reduce or eliminate interference between subsystem blocks. Consider the model of a commercial airliner. Such a model may include many interconnected subsystems. Two of those subsystems may include the air conditioning subsystem and the engine subsystem. A malfunction in the air conditioning subsystem may be an inconvenience, while a malfunction in the engine subsystem would likely constitute an emergency.

In this example, it is important that the state of the air conditioning subsystem does not unintentionally influence the engine subsystem. In other words, a malfunction of an non-critical subsystem should not be allowed to precipitate a malfunction of a mission-critical subsystem.

A modeling tool may describe the commercial airliner as an interconnection of a thousand or more subsystems, presented as a complex modeling tool (e.g., Simulink) block diagram. The air conditioner subsystem and the engine subsystem may be just a small percentage of the many subsystems in the airliner design. Deployable code may be directly automatically and/or generated from this block diagram and later deployed to the computers on board the actual airliner.

The described embodiments present a technique for identifying if the above-mentioned subsystem interference occurs. Identifying that the above-mentioned subsystem interference does not occur in the model may ensure that the above-mentioned subsystem interference will not occur and thus in the generated code.

The described embodiments apply the notion of integrity level to subsystem blocks and their inports and outports, and may utilize an associated type-checking system to enforce rules based on the integrity levels. The rules may help reduce the likelihood of interference between subsystem blocks. The described embodiments may enable modeling tools to detect and prevent interference between subsystem blocks at design time, to facilitate high integrity system modeling.

The integrity level of a subsystem may describe the criticality of the subsystem, i.e., how important the subsystem is to the expected performance of the overall system of which the subsystem is a part. In some embodiments, a designer can associate an integrity level to a subsystem block or to an inport or outport (or combinations thereof) of the subsystem block by assigning an integrity level property to the subsystem block, inport or outport. In other embodiments the type-checking system can assign an integrity level property to a subsystem block inport or outport based on the integrity level that has been defined for or associated with the associated subsystem block. In some embodiments, the integrity level property is characterized by discrete values, while in other embodiments the integrity level is characterized by a selection from a range defining a continuum of integrity levels.

In an embodiment, integrity levels may be specified or stipulated by system or subsystem requirements. For example, a portion of a requirements specification for a subsystem may include predefined integrity levels for one or more elements of that subsystem. When the subsystem is modeled by the graphical modeling tool, a designer may extract information (e.g., manually or automatically from a requirements specification for use in creating/designing the model. During the design, the designer may transfer the integrity levels from the requirements specification to the model either during or following the design process.

The integrity levels specified for subsystem components may relate to a real time system constraint, such as allowed latency for particular components. For example, code generated from models constructed according to the described embodiments may be executed in a particular order and/or with a different priority, the order being relative to the associated integrity level. Code associated with lower integrity levels may be treated as less critical, providing greater flexibility as to when that code executes relative to when more critical (i.e., higher integrity) code executes.

The non-interference discipline enforced by the type system of the described embodiments may result in more reliable deployed code. For example, suppose a pair of subsystems are constructed according to the described embodiments such that neither subsystem interferes with the other. Code deployed based on those subsystems is less likely to interfere with each other than without using such non-interference discipline, and thus can potentially be executed in parallel.

In one or more of the described embodiments, a designer can associate an integrity level with any subsystem block. The designer can likewise associate an integrity level with the inports and the outports of the subsystem. In the described embodiment, a rule associated with the integrity levels is as follows: the computational behavior of a first subsystem can only be influenced, directly or indirectly, by a second subsystem having an integrity level at least as high as the integrity level of the first subsystem.

An integrity level l may come from a partial order set that the user can define, and the only significant information that the user should supply is the level's order with respect to another level. For example, the order may be similar to the subclass relationship in an OO (Object-Oriented) design. For example, $l_1 \leq l_2$ stands for level $l_2$ being at least as high as level $l_1$. Since it is a partial order set, the elements obey the reflexivity, antisymmetry, and transitivity rules, i.e., for all levels l, m, n, we have:

$l \leq l$ (reflexivity)

if $l \leq m$ and $m \leq l$ then, $l = m$ (antisymmetry)

if $l \leq m$ and $m \leq n$ then, $l \leq n$ (transitivity)

Figure 1:
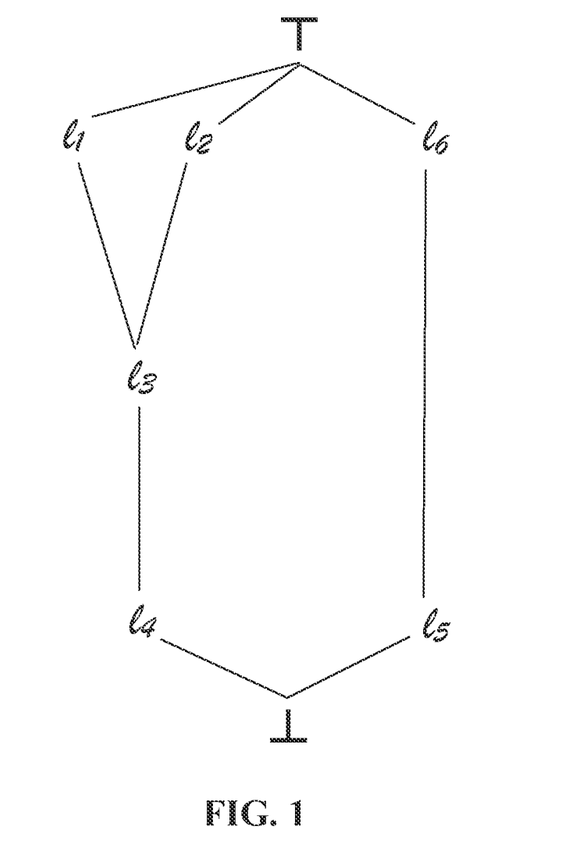
FIG. 1 illustrates an example of an integrity level partial order set.

FIG. 1 is illustrates an example of an integrity level partial order set that the user could define ($\top$ and $\bot$ represent the top and the bottom of all the integrity levels, respectively).

FIG. 1 demonstrates defined integrity levels having the following relationships:

$\bot \leq l_5 \leq l_6 \leq \top$, $\bot \leq l_4 \leq l_3 \leq l_1 \leq \top$ $\bot \leq l_4 \leq l_3 \leq l_2 \leq \top$ In partial ordered sets, not all elements have defined relationships. For example, in FIG. 1, no relationship is defined between $l_1$ and $l_2$, or between $l_6$ and $l_4$.

The disclosed type-checking system is immediately useful to enforce other similar but more subtle non-interference disciplines in modeling tools. Examples of those interferences include, but are not limited to, sample time, data type, and signal dimension type propagations between subsystems. For example, if one were to enforce a discipline such that the sample time of subsystem A should have an independent sample time of Subsystem B and vice versa, the designer could choose to label A with integrity level l and to label B with integrity level m such that $l \leq m \wedge m \leq l$. Alternatively, or additionally, the designer could choose to label the sample time property of subsystem A with integrity level l and to label the sample time property of subsystem B with integrity level m such that $l \leq m \wedge m \leq l$.

In the described embodiments, an integrity level may be labeled on a subsystem block, the subsystem block inports, the subsystem block outports, a connection from or to the subsystem block, the subsystem block properties, the subsystem block inport properties, the subsystem block outport properties, or any combination thereof. Such labeling may be accomplished by assigning an integrity level property to the relevant subsystem block or the relevant subsystem component and/or a connection, as described above.

As an example regarding architectural patterns, a component having an integrity level of SIL4 in an hierarchical system may be realized by assigning SIL4 to all the elements in the hierarchy that are beneath the SIL4 component. However, this approach may not be cost and/or resource effective. Alternatively this behavior can be realized by decomposing the SIL4 component into two parallel and independent SIL3 components that are arbitraged by some voting component. Yet alternatively, the same SIL4 may be realized by decomposing it in less critical SIL2 component that implements the algorithm and a SIL4 component that checks whether SIL2 component works properly. In this case two different architectural (or decomposition) patterns (two parallel channels plus voter; algorithm component and independent supervision component) are present that allow to achieve a higher integrity level by combining components with lower integrity levels in some specific patterns. Note that patterns and integrity levels are just examples that may be different for different standards. Some safety standards refer to these concepts as SIL arithmetic or ASIL decomposition.

Based on knowledge about such architectural patterns and on information that designates certain components as elements of such patterns, the type-checking system may calculate different integrity levels as compared to a type-checking system that does not have information about those patterns. The different integrity levels as calculated by the type-checking system that has information about those patterns may be better, more accurate, more useful, etc. Based on a given model structure the type-checking system may also propose architectural modifications to increase and/or decrease the integrity level of certain components.

As used herein, the symbol L denotes the integrity level that is marked by a designer on a subsystem block, any of its inports or outports, or any of the connections to or from a subsystem block. Some embodiments reduce or eliminate interference between subsystem blocks by enforcing the discipline that the computational behavior of a first subsystem block can only be influenced by another subsystem block the integrity level of which is higher or equal than the integrity level of the first subsystem block. This discipline may be notationally set forth with the two type-checking rules as follows. Given a subsystem block S:

$\forall_i \in \text{inports}(S), L(S) \leq L(i)$ [A1]

$\forall_o \in \text{outports}(S), L(o) \leq L(S)$ [A2]

These two type-checking rules ensure that: (1) the integrity level marked for a subsystem block is not higher than the integrity level of any of its inports, and (2) the integrity level for a subsystem block is at least as high as the highest integrity level marked for all of its outports.

The discipline described above may be further enforced by implementing the following outport to inport connection type-checking rule: if the outport (O) and the inport (i) belong to a different subsystem block, then:

$O \rightarrow i$ if and only if $L(i) \leq L(O)$ [A3]

where $O \rightarrow$ means that an outport can connect to an inport. This type checking rule makes sure that an outport can only influence an inport whose integrity level is not higher than the outport.

In some embodiments, the integrity level may be inferred rather than assigned. Inferring integrity levels means that unspecified integrity levels (which may include, for example, specified yet default integrity levels) of connections, inports, outports and/or subsystem blocks may be determined through the equality/inequality system of [A1], [A2] and [A3] described in the preceding paragraphs, provided that a solution for the equation system exists. If integrity assignments corresponding to a solution cannot be found, then an invalid connection in the block diagram is must exist and a type checking error may be reported. Propagation of integrity levels from associated subsystem blocks is an example of a technique for inferring an integrity level. Propagation may be upstream (e.g., following the input to output direction of a connection), downstream (e.g., following the output to input direction of a connection), or a combination.

In some embodiments, inferring the integrity level of an unassigned inport or outport may change the integrity level of a port connected to the unassigned port. For example, if the integrity level of the unassigned inport or outport is inferred because of the unassigned inport or outport being related to a lower-level subsystem block, this inference may cause the integrity level of the port connected to the unassigned port to increase. Re-wiring a connection between an inport/outport is another condition that may cause the integrity level to increase. The integrity levels may need to be changed so that the equation system mentioned above can be satisfied. The integrity level change may be determined based on one or more redundancy requirements. Such redundancy requirements may include inference based on a series of requirements linked to one another, or inference based on information regarding architectural patterns of the modeled system, or explicit indication by a designer or other user.

If a block diagram satisfies the type-checking rules set forth above, given any two subsystems blocks A and B, if $L(A) \leq L(B)$ and $L(A) \neq L(B)$, then subsystem block A will not influence the functionality of subsystem block B because no output of subsystem block A will (directly or indirectly, that is, with output of subsystem block A driving input of subsystem block B via other blocks) drive an input of subsystem block B.

One of the type-checking rules may be restated as requiring that a receiving subsystem block is not permitted to accept information from a transmitting subsystem block that has an integrity level property that is lower than the integrity level property of the receiving subsystem block. Another of the type-checking rules may be restated as requiring that a transmitting subsystem block is not permitted to provide information to a receiving subsystem block that has an integrity level that is higher than the integrity level of the transmitting subsystem block.

The type-checking system of the described embodiments may implement the type-checking rules described above by evaluating the integrity level properties of an inport/outport pair to determine whether the connection is appropriate or inappropriate with respect to the above-mentioned rules. The connection may be appropriate if the above-mentioned rules are satisfied, and the connection may be inappropriate if the above-mentioned rules are not satisfied.

If the connection is determined to be inappropriate, then in some embodiments the type-checking system performs an action to address the inappropriate connection. For example, the type-checking system may sever the connection of the input/output pair. As another example, the type-checking system may present an indication that identifies the connection of the input/output pair as being inappropriate.

In an embodiment, the evaluation of the type-checking rules may occur as the designer creates the connections between the subsystem blocks in the model, so that the designer can receive an indication of whether the connection is appropriate or inappropriate during the design process. In other embodiments, the evaluation of the type-checking rules may occur after the designer as completed all of the connections, or after completing a predetermined number of connections. The predetermined number may be a value selected arbitrarily by the user or determined by the system (e.g., based on system parameters such as available memory, processing time, number of available computing cores, etc.), or it may be based on items such as the size of the model, the number of inports and outports, and the like. In yet other embodiments, the evaluation of the type-checking rules may be invoked based on a user command.

Figure 2:
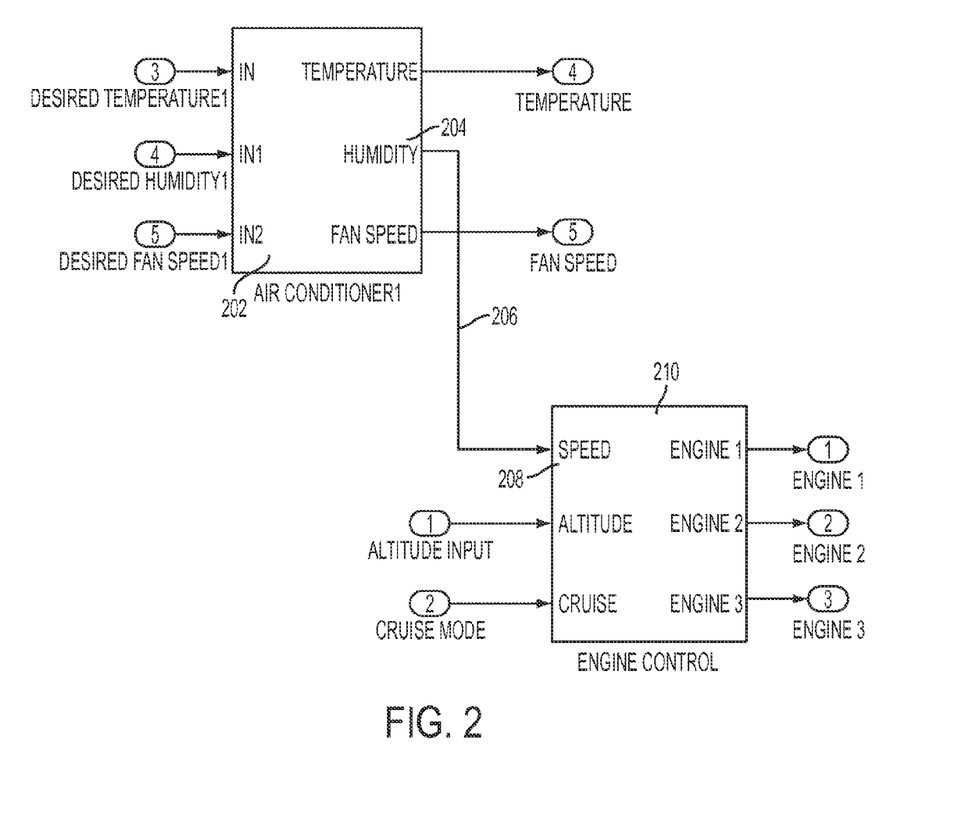
FIG. 2 illustrates a first example of a model according to the invention.

Described embodiments may be demonstrated with the example shown in FIG. 2. This example, based on the commercial airline model described above, shows an erroneous connection 206 from the Humidity outport 204 of the Air Conditioner subsystem 202 to the Speed import 208 of the Engine Control subsystem block 210.

In this example, the designer labels each of the relevant subsystem blocks with a particular integrity level. For example, the designer may label the Air Conditioner1 subsystem block with integrity level L and the Engine Control subsystem block with integrity level H, where $L \leq H$.

Figure 3:
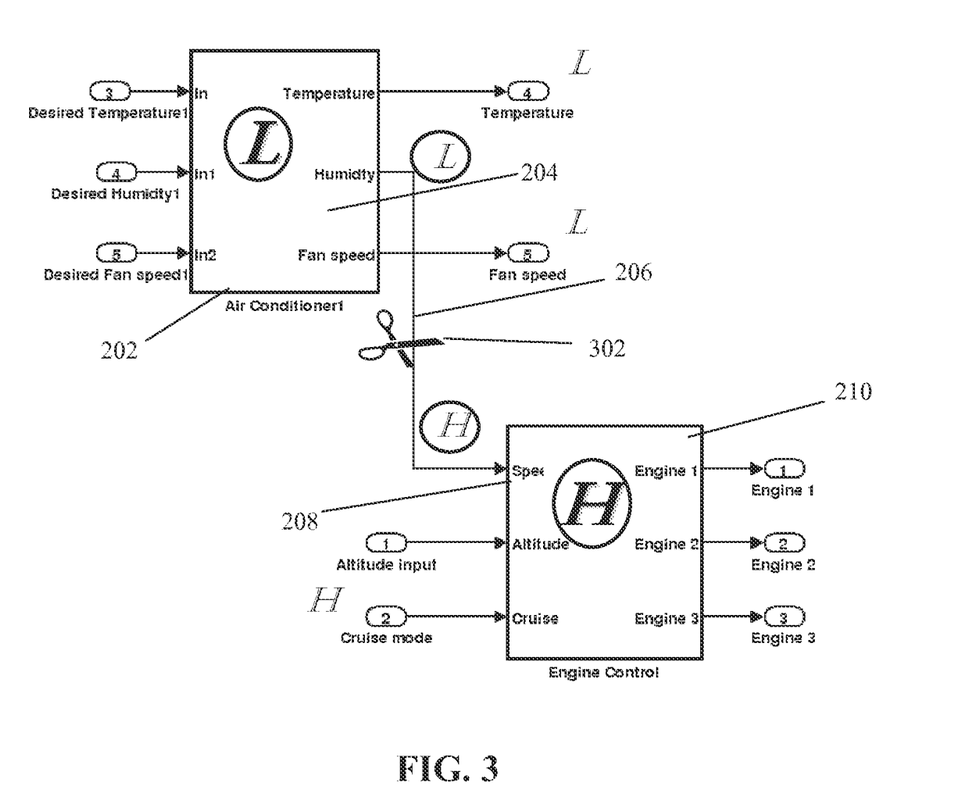
FIG. 3 illustrates a second example of a model according to the invention.

In an embodiment, the type-checking system automatically infers the integrity levels for the inports and outports, based on the subsystem integrity levels L and H, and from the typing rules set forth herein. In this exemplary case, there may be only one possibility for the outports of the Air Conditioner1 subsystem block and the inports of the Engine Control subsystem block, as illustrated in FIG. 3. The type-checking system determines that the line 206 connecting the two subsystems is illegal with respect to the type-checking rules. In an embodiment, the type-checking system reports the illegal connection to the user. In another embodiment, the type-checking system automatically severs 302 the illegal connection to eliminate this case of subsystem interference. In yet another embodiment, the type-checking system may report to the user the lowest integrity level that could be assigned to the Air Conditioner1 subsystem block while still meeting the type-checking rules. Further, another embodiment may provide the user with an option to automatically lower the integrity level of the Engine Control subsystem block so that it matches (or is otherwise compatible with) the integrity level of the Air Conditioner1 subsystem block. Yet further, another embodiment may provide the user with an option to automatically increase the integrity level of the Air Conditioner1 subsystem (e.g., based on an architectural pattern) so that it matches (or is otherwise compatible with) the integrity level of the Engine Control subsystem. In yet a further embodiment, during editing, the user may not be able to create a connection between the Air Conditioner1 subsystem block and the Engine Control subsystem block.

Embodiments described herein can be implemented on various types of computer systems (e.g., desktop, laptop or notebook PC, mobile handheld computing system, workstation or other particular machine). Described embodiments may be implemented in a computer program product that may be non-transitory and may be tangibly embodied in a machine-readable storage medium for execution by the computer system. Methods of described embodiments may be performed by a computer system executing a program to perform functions, described herein, by for example, operating on input data and/or generating output.

Figure 4:
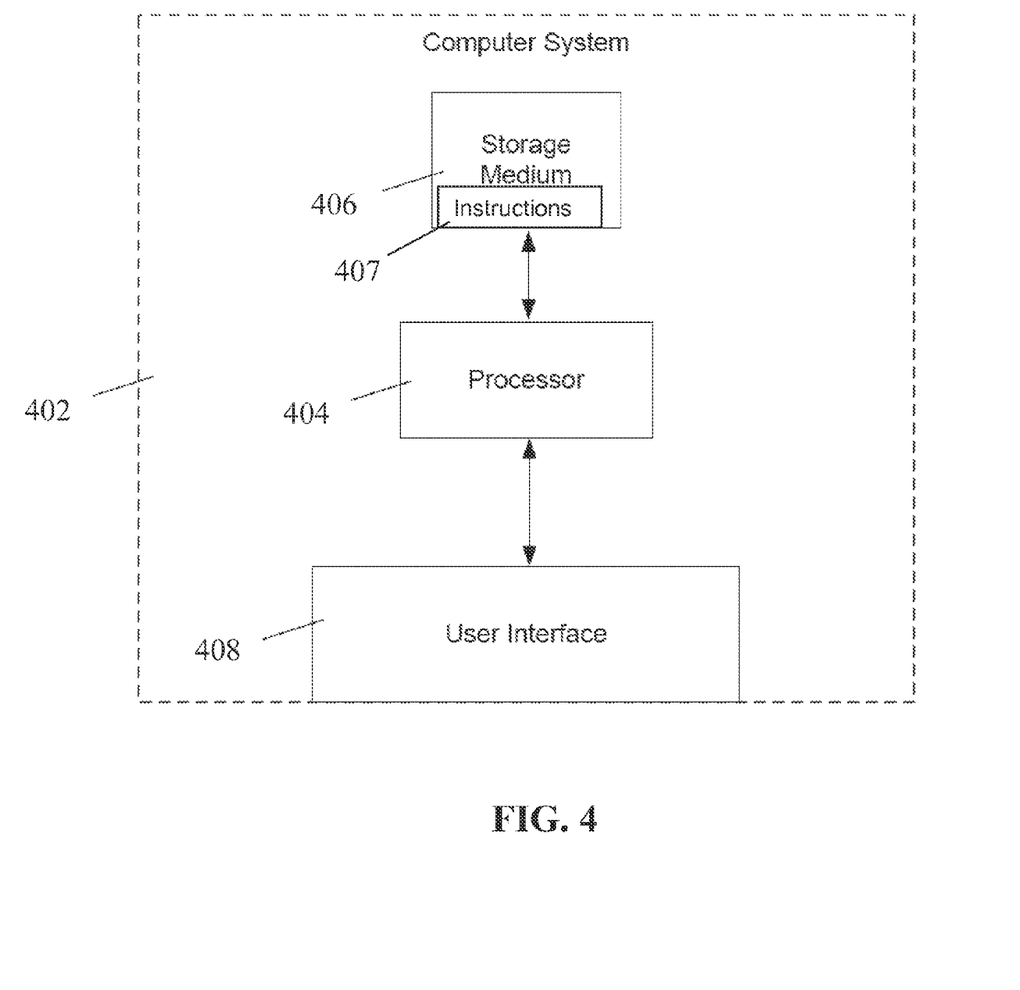
FIG. 4 shows an exemplary computer system suitable for supporting the described embodiments of the invention.

An exemplary computer system 402 is shown in FIG. 4. Referring to FIG. 4, computer system 402 may include a processor 404, an information storage medium 406, and a user interface 408. These components may be contained within a typical desktop, laptop or mobile form factor housing, or they may be integrated into a single component such as a multi-chip module or ASIC (application specific integrated circuit).

Suitable processors 404 may include, for example, both general and special purpose microprocessors. Generally, the processor 404 receives instructions and data from a read-only memory (ROM) and/or a random access memory (RAM) through a CPU bus. The processor 404 may also receive programs and data from a storage medium 406, such as, for example, an internal disk operating through a mass storage interface, or a removable disk operating through an I/O interface. Instructions 407 for executing the described embodiments may be stored on the storage medium.

Information storage media 406 suitable for tangibly embodying computer program instructions for implementing the described embodiments may include various forms of volatile memory and/or non-volatile memory, including but not limited to, semiconductor memory devices, such as EPROM, EEPROM, and flash memory devices, and magnetic disks, such as internal hard disks and removable disks, magneto-optical disks, and CD-ROM disks. The information storage medium 406 may also store an operating system ("OS"), such as Windows or Linux, which the processor may execute to provide, for example, a supervisory working environment for the user to execute and control, for example, one or more embodiments of the invention.

The user interface 408 may include a keyboard, mouse, stylus, microphone, camera, accelerometer, gyroscope, trackball, touch-sensitive screen, or other input device. These elements are typically found in a conventional desktop computer as well as other computers and workstations suitable for executing computer programs implementing methods described herein (e.g., smartphones, tablet computers, notebook computers, etc.). The computer system 402 may also be used in conjunction with a display device for providing a GUI. The display device may include an output device that may be capable of producing color or gray scale pixels on paper, film, display screen, or other output medium.

The touch-sensitive screen described above may be used to effect a multi-point input interface. For example, the user may sequentially or simultaneously select items in the GUI using two or more fingers.

The graphical modeling tools of the described embodiments may provide (and operate within) what is generally known as a Technical Computing Environment (TCE). A TCE is a computing environment that can, for example, perform numerical linear algebraic calculations, solve ordinary differential equations, analyze data, and visualize solutions to complex mathematical formulas by generating graphs or other images. The TCE can enable a user to perform tasks related to disciplines such as mathematics, science, engineering, medicine, business, biology and finance, to name a few. The TCE may include a programming language (e.g., the MATLAB language) to express problems and/or solutions in mathematical notations. The programming language may be suitable for non-professional programmers and may provide graphical tools for use in creating plots, surfaces, images, volumetric representations, or other representations. The TCE may provide these routines and/or tools using toolboxes (e.g., toolboxes for signal processing, image processing, data plotting, parallel processing, etc.). The TCE may also provide these routines in other ways, such as, for example, via a library, local or remote database (e.g., a database operating in a computing cloud), remote procedure calls (RPCs), and/or an application programming interface (API). Embodiments of the TCE may be configured to improve runtime performance when performing computing operations. For example, TCE may include a just-in-time (JIT) compiler in an exemplary embodiment.

The TCE may perform matrix and/or vector computations for use in data analysis, data visualization, application development, simulation, modeling, and/or algorithm development. Fields of use may include, but are not limited to, statistics, image processing, signal processing, control design, life sciences modeling, financial modeling, discrete event analysis and/or design, and state-based analysis and/or design.

Examples of TCEs and/or TCE-like applications that may be adapted to implement one or more embodiments of the invention may include, but are not limited to applications that implement languages such as the MATLAB® environment available from The MathWorks, Inc.; GNU Octave from the GNU Project; Mathematica from Wolfram Research, Inc.; Mathcad from Mathsoft Engineering & Education Inc.; Maple from Maplesoft; Scilab from The French Institution for Research in Computer Science and Control (INRIA); Virtuoso from Cadence; or Modelica or Dymola from Dassault Systèmes.

In another example embodiment, the TCE may be implemented in a graphically-based modeling environment using products such as, but not limited to, Simulink®, Stateflow®, SimEvents®, Simscape™, etc., by The MathWorks, Incorporated; VisSim by Visual Solutions; LabViewt by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Figure 5:
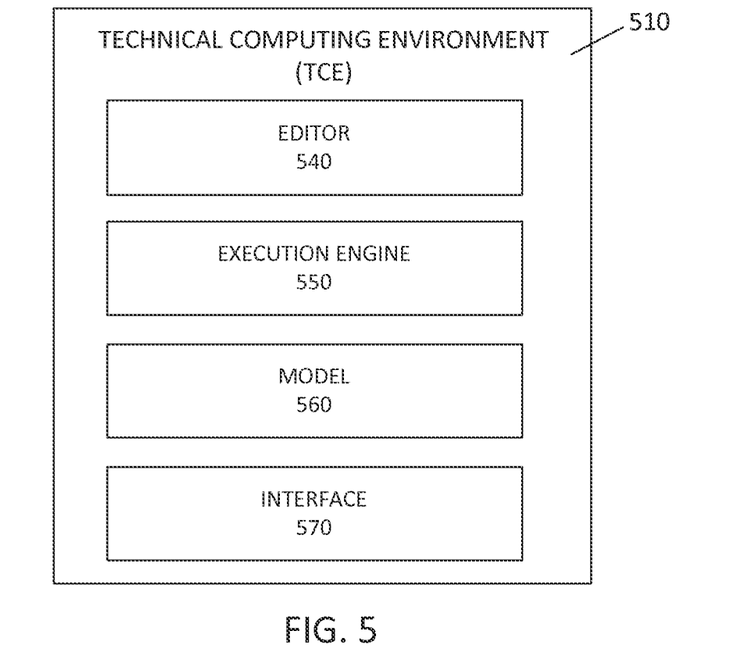
FIG. 5 shows an example of a Technical Computing Environment (TCE).

FIG. 5 depicts an exemplary TCE 510, which includes an editor 540, an execution engine 550, a model 560, and an interface 570. Other embodiments of a TCE may contain, for example, more components or fewer components than the components illustrated in FIG. 5. Moreover, in other embodiments of a TCE, routines performed by the various components contained in TCE may be distributed among the components differently than described herein and shown in FIG. 5.

Editor 540 may support receiving instructions through user interface 408 on behalf of a user (e.g., textual code received from a keyboard). Editor 540 may further support editing code (e.g., source code), requirements, and/or tests that may be generated from or otherwise associated with model 560. In an embodiment, editor 540 may be a block diagram editor that allows a user to, for example, specify, edit, annotate, save, publish, and/or print the model 560. For example, a block diagram of model 560 may be presented (e.g., displayed) and the editor 540 may contain one or more provisions for specifying, editing, annotating, saving, publishing, and/or printing the block diagram. In another embodiment, editor 540 may provide a user interface that allows a user to make use of scripts that can include first routines compatible with an informal interface and second routines compatible with a formal interface. A script may be a collection of routines that are sequenced and editor 540 may allow first routines and second routines to be used interchangeably within the user interface or script.

Execution engine 550 may use model 560 to simulate some or all of the system represented by model 560. The simulation may include performing various computations, associated with the system, based on information (e.g., geometry information) associated with one or more textual or graphical modeling elements contained in model 560. The computations may include, but are not limited to, computations of dynamics, statics, equilibrium, mass, inertia, collision detection, collision response, and/or force fields associated with the system.

Model 560 may be, for example, a textual-model or a graphical model. Model 560 may include, but is not limited to, a time-based graphical block diagram model, a state transition diagram, a discrete event model, an activity diagram, a Unified Modeling Language (UML) diagram, a sequence diagram, an entity flow network and a data flow model. Model 560 may represent a system, such as a physical system. The system represented by model 560 may be dynamic, linear, non-linear, a combination of these or some other type of system. The model 560 may have executable semantics and/or may be executable.

A time based block diagram may consist, for example, of blocks (e.g., the subsystem blocks described herein) connected to one another (e.g., via connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to zero or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

The described embodiments may also include a code generator for generating code from a model. In an embodiment, the code generator may analyze a model generated by the described graphical modeling tool and produce code that corresponds to the model. In an embodiment, code generator can generate source code, assembly language code, binary code, interface information, configuration information, performance information, etc., from all or a portion of a graphical model. For example, the code generator can generate C, C++, SystemC, Java, etc., from the graphical model. Embodiments of code generator can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL, VHDL, Verilog, et al.), Automotive Open System Architecture (AUTOSAR), etc.).

In a hierarchical state transition diagram (e.g., MathWorks Stateflow environment), a particular state may have one or more substates. Each of these substates may have a certain integrity level that is based on the superstate (or superstates) associated with the substates. Similarly, the superstate (or superstates) may have a certain integrity level based on one or more of the substates below the superstate (or superstates).

The described integrity level relationship between superstates and substates may be extended generally to any hierarchical structure, such that integrity levels of one hierarchical level is determined from another hierarchical level.

Similarly, the described integrity level relationship between superstates and substates may be extended generally to textual languages (e.g., "C", "C++", MATLAB, et al.). For example, a function call made within a textual language may have more function calls nested within that function call (i.e., sub-function calls within the main function call). An integrity level relationship may therefore exist between the sub-function calls and the main function call, or between the main program and the called programs.

In some embodiments, a subsystem block may be designated as "trustworthy," which means that the subsystem block and all of the components within the subsystem block have been verified as reliable and so may be excluded from an integrity level analysis. Such a trusted assembly may be deemed to have a predetermined integrity level for the purpose of analyzing other subsystem blocks in the system. No time or computing resources needs to be dedicated to analyzing the components within the trusted assembly. The trusted assembly may have been evaluated at a time prior to the analysis of the subsystem block in which the trusted assembly is a component. The use of a trusted assembly may expedite the analysis of the overall system.

In some embodiments, the code generator may generate code for only certain portions of the graphical model. For example, in one embodiment the code generator may generate code only for portions of the graphical model characterized by a particular integrity level, above a certain integrity level threshold or below a certain integrity level threshold.

Figure 6:
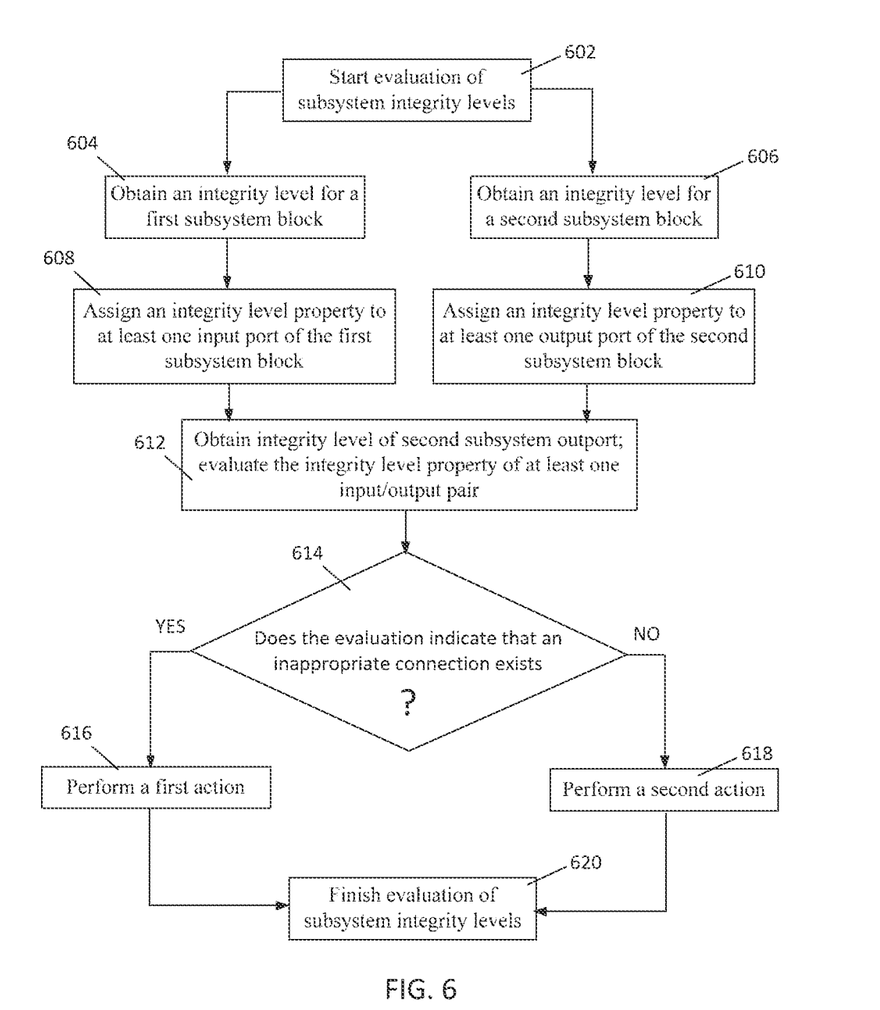
FIG. 6 shows one of the described embodiments.

FIG. 6 illustrates one of the described embodiments in which subsystem blocks of a graphical model are evaluated to reduce or prevent interference between the blocks. Step 602 marks the beginning of the evaluation. At step 604, an integrity level is obtained for a first subsystem block of the model. The integrity level describes the extent to which the subsystem block is critical to the system. At step 608, an integrity level property is assigned to at least one of the input ports (inports) of this first subsystem block. The integrity level property is based on the integrity level of the first subsystem block.

At step 606, an integrity level is obtained corresponding to a second subsystem block of the model. At step 610, an integrity level property is assigned to at least one of the output ports (outports) of the second subsystem block. The integrity level property is based on the integrity level of the second subsystem block.

At step 612, the integrity level property of at least one inport/outport pair is evaluated to determine whether the connection of the inport-to-outport pair is inappropriate. An inport/outport pair is a second subsystem output connected to first subsystem input.

Step 614 represents the result of the evaluation of step 612. When the evaluation indicates that an inappropriate connection exists, a first action is performed as in step 616. When the evaluation indicates that the connection is not inappropriate, a section action is performed as shown in step 618. After either the first or second action is performed, the evaluation is complete as shown in step 620.

Figure 7:
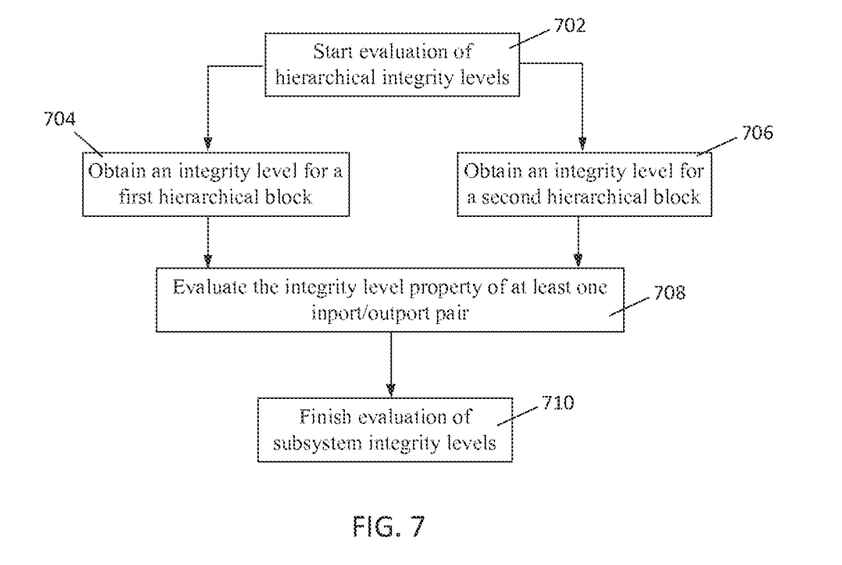
FIG. 7 shows another of the described embodiments.

FIG. 7 illustrates another of the described embodiments in which hierarchical blocks of a graphical model are evaluated to reduce or prevent interference between the blocks. Step 702 designates the beginning of the evaluation. At step 704, an integrity level is obtained for a first hierarchical block of the model. At step 706, an integrity level is obtained for a second hierarchical block of the model. At step 708 the integrity level property of at least one inport/outport pair is evaluated to determine whether the connection of the inport-to-outport pair is inappropriate. After the inport/outport pair evaluation is complete, the integrity level evaluation is finished as shown in step 710.

The described embodiments may evaluate the hierarchical structure of subsystem components (or other hierarchical structures) to determine which subsystem components (one or more) or subsystem blocks (one or more), if their integrity levels were increased, would have a multiplicative impact (e.g., the greatest impact) achieving appropriate connections. For example, increasing the integrity level of one subsystem block with outports that are connected to inports of a number of other subsystem blocks may increase the integrity level of some or all of these other subsystem blocks. This measure of sensitivity to integrity variations may be used, for example, to aid a user in optimizing a system design with respect to overall integrity.

Further, the described embodiments may include a "Model Advisor" for analyzing a set of subsystem components or subsystem blocks to determine which subsystem components or subsystem blocks are candidates for implementing an increased integrity value. Adding redundancy may be one way to increase the integrity of a subsystem block. The measure of integrity evaluation described herein may be used for this analysis.

The described embodiments may evaluate the hierarchical structure of subsystem components (or other hierarchical structures) to determine which subsystem component (one or more) or subsystem blocks (one or more), if their integrity levels were decreased, would have less (e.g., the least) impact on achieving appropriate connections than decreasing the integrity level of other subsystem components or subsystem blocks. This measure of sensitivity to integrity variations may be used, for example, to aid a user in determining which subsystem component or subsystem block could have a reduced integrity value with little or no effect on other subsystems within a system.

The "Model Advisor" described herein may be used for analyzing a set of subsystem components or subsystem blocks to determine which subsystem components or subsystem blocks are candidates for implementing a decreased integrity value. The measure of integrity evaluation described herein may be used for this analysis.

The described embodiments are not limited to an implementation that is contained within a single platform. The described embodiments may also be suitable for use in a distributed computing environment or in an environment of computing devices communicating through a network or other linked architecture. For example, a first computer system may be used to evaluate one or more subsystem blocks, while a second computer system may be used to evaluate one or more other subsystem blocks.

In some embodiments, subsystem blocks may be assigned to different groups. In this configuration, subsystem blocks from one group may be processed independently from subsystem blocks in other groups.

The foregoing description of embodiments is intended to provide illustration and description, but is not intended to be exhaustive or to limit the invention to the precise form disclosed. Modifications and variations are possible in light of the above teachings or may be acquired from a practice of the invention. Further, non-dependent acts may be performed in parallel. Also, the term "user", as used herein, is intended to be broadly interpreted to include, for example, a computing device (e.g., a workstation) or a user of a computing device, unless otherwise stated. The term "designer" may be used herein in place of "user."

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media 406 and may include computer-executable instructions that may be executed by a processor, such as processor 404. The computer-executable instructions may include instructions that implement one or more embodiments of the invention. The tangible computer-readable storage media 406 may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. One or more tangible non-transitory computer-readable storage media comprising computer-executable instructions executable by processing logic, the media storing one or more instructions operable to cause the processing logic to perform steps including:

providing a user interface to generate a graphical model representing a system;

obtaining a first integrity level for a first subsystem block in the graphical model, the first integrity level describing an importance value of the first subsystem block in the system represented by the graphical model;

obtaining a second integrity level for a second subsystem block in the graphical model, the second integrity level describing an importance value of the second subsystem block in the system represented by the graphical model;

assigning a third integrity level to an inport of the first subsystem block, the third integrity level being based on the first integrity level associated with the first subsystem block;

assigning a fourth integrity level to an outport of the second subsystem block, the fourth integrity level being based on the second integrity level associated with the second subsystem block;

determining an existence of a connection including the inport of the first subsystem block and the outport of the second subsystem block;

when the connection exists, evaluating the third integrity level and fourth integrity level to determine whether the connection is inappropriate; and when the evaluation indicates that the connection is inappropriate, performing an action to prevent unintentional influence by the outport of the second subsystem block on the inport of the first subsystem block in the graphical model.

2. The media of claim 1, wherein obtaining the first integrity level includes inferring the first integrity level.

3. The media of claim 1, further including inferring an integrity level of an unassigned port based on a set of rules that include at least one of:

a first rule indicating a receiving subsystem block is not permitted to accept information from a transmitting subsystem block that has an integrity level that is lower than the integrity level of the receiving subsystem block, and a second rule indicating a transmitting subsystem block is not permitted to provide information to a receiving subsystem block that has an integrity level that is higher than the integrity level of the transmitting subsystem block.

4. The media of claim 2, wherein inferring the first integrity level changes an integrity level of a port connected to the first subsystem block.

5. The media of claim 4, wherein the change is determined based at least one redundancy requirement.

6. The media of claim 5, wherein the at least one redundancy requirement is one or more of inferred from linked requirements, inferred from a pattern, and indicated by a user.

7. The media of claim 1, wherein at least one of the first integrity level and the second integrity level is selected from a range defining a continuum of integrity levels.

8. The media of claim 1, wherein the evaluating further includes determining that an inappropriate connection exists when the first integrity level is lower than the second integrity level.

9. The media of claim 1, wherein the third integrity level is at least as high as the first integrity level defined for the first subsystem block, and the fourth integrity level is at least as high as the second integrity level defined for the second subsystem block.

10. The media of claim 1, wherein performing an action includes severing the connection including the inport of the first subsystem block and the outport of the second subsystem block.

11. The media of claim 1, wherein performing an action includes presenting an indication identifying that the connection is inappropriate.

12. The media of claim 1, wherein the evaluating occurs when the connection is created between the first subsystem block and the second subsystem block.

13. The media of claim 1, wherein the evaluating occurs after the connection between the first subsystem block and second subsystem block has been specified.

14. The media of claim 1, wherein the first subsystem block is evaluated on a first computer system and the second subsystem block is evaluated on a second computer system.

15. The media of claim 1, wherein the first subsystem block is part of a first group and the second subsystem block is part of a second group, and wherein the evaluating is performed independently within the first group and the second group.

16. The media of claim 1, wherein the first integrity level is indicative of allowed latency for the first subsystem block.

17. The media of claim 1, wherein the first integrity level is indicative of an importance of the first subsystem block to a performance of the system represented by the graphical model.

18. One or more tangible non-transitory computer-readable storage media comprising computer-executable instructions executable by processing logic, the media storing one or more instructions operable to cause the processing logic to perform steps including:
providing a user interface to generate a graphical model representing a system;
obtaining a first integrity level for a first hierarchical block in a graphical model, the first integrity level describing an importance value of the first hierarchical block in the system represented by the graphical model, wherein the first integrity level of the first hierarchical block is obtained based on integrity levels of at least one constituent component of the first hierarchical block;
obtaining a second integrity level for a second block in the graphical model, the second integrity level describing an importance value of the second block in the system represented by the graphical model;
determining an existence of a connection including the first hierarchical block and the second block;
when the connection exists, evaluating the obtained first integrity level of the first hierarchical block and the second integrity level of the second block to determine an appropriateness of the connection between the first hierarchical block and the second block; and
when the evaluation indicates that the connection is inappropriate, performing an action to prevent unintentional influence by the second block on the first hierarchical block in the graphical model.

19. The media of claim 18, wherein the first hierarchical block is one of a subsystem block or a substate block.

20. The media of claim 19, wherein the integrity level obtained based on integrity levels of the at least one constituent component of the subsystem block is assigned to at least one of an inport and an outport of the subsystem block.

21. The media of claim 18, wherein contributions of the integrity levels of the constituent components in determining the integrity level of the first hierarchical block are reduced.

22. The media of claim 21, wherein the first integrity level is reduced when the first hierarchical block is deemed to be trustworthy.

23. The media of claim 21, wherein the first integrity level is reduced based on an architectural pattern in which the first hierarchical block resides.

24. The media of claim 18, wherein integrity levels of the at least one constituent component of the first hierarchical block contribute to the first integrity level, and the contributions are reduced based on an architectural pattern in which at least two of the constituent components reside.

25. The media of claim 18, wherein the first hierarchical block has an assigned integrity level.

26. The media of claim 25, wherein a comparison is made between the assigned integrity level of the first hierarchical block and the integrity level obtained based on integrity levels of the at least one constituent component of the first hierarchical block, and wherein an action is taken to indicate the results of the comparison.

27. A method, executed by a specialized apparatus comprising at least one processor configured to execute instructions stored in a memory, the method comprising:
providing, by the at least one processor, a user interface to generate a graphical model representing a system;
obtaining, by the at least one processor, a first integrity level for a first subsystem block in the graphical model, the first integrity level describing an importance value of the first subsystem block in the system represented by the graphical model;
obtaining, by the at least one processor, a second integrity level for a second subsystem block in the graphical model, the second integrity level describing an importance value of the second subsystem block in the system represented by the graphical model;
assigning, by the at least one processor, a third integrity level an input port of the first subsystem block, the third integrity level being based on the first integrity level associated with the first subsystem block;
assigning, by the at least one processor, a fourth integrity level an output port of the second subsystem block, the fourth integrity level being based on the second integrity level associated with the second subsystem block;
determining, by the at least one processor, an existence of a connection including the input port of the first subsystem block and the output port of the second subsystem block;
when the connection exists, evaluating, by the at least one processor, the third integrity level and fourth integrity level to determine whether the connection is inappropriate; and
when the evaluation indicates that the connection is inappropriate, performing an action to prevent unintentional influence by the output port of the second subsystem block on the input port of the first subsystem block in the graphical model.

28. The method of claim 27, further including inferring an integrity level of an unassigned port based on a set of rules that include at least one of:
a first rule indicating a receiving subsystem block is not permitted to accept information from a transmitting subsystem block that has an integrity level that is lower than the integrity level of the receiving subsystem block, and
a second rule indicating a transmitting subsystem block is not permitted to provide information to a receiving subsystem block that has an integrity level that is higher than the integrity level of the transmitting subsystem block.

29. The method of claim 27, wherein at least one of the first integrity level, the second integrity level, the third integrity level, and the fourth integrity level is selected from a range defining a continuum of integrity levels.

30. The method of claim 27, wherein evaluating further comprises determining that an inappropriate connection exists when the first integrity level is lower than the second integrity level.

31. The method of claim 27, wherein the third integrity level for the output ports of the first subsystem block is at least as high as the first integrity level defined for the first subsystem block, and the fourth integrity level for the output ports of the second subsystem block is at least as high as the second integrity level defined for the second subsystem block.

32. The method of claim 27, wherein performing the action includes severing the connection.

33. The method of claim 27, wherein performing the action includes presenting an indication identifying that the connection is inappropriate.

34. The method of claim 27, wherein the evaluating occurs while the connection is created between the first subsystem block and the second subsystem block.

35. The method of claim 27, wherein the first subsystem block is evaluated on a first computer system and the second subsystem block is evaluated on a second computer system.

36. The method of claim 27, wherein the first subsystem block is part of a first group and the second subsystem block is part of a second group, and wherein the evaluating is performed independently within the first group and the second group.

* * * * *